Aug. 19, 1969 J. A. FORS 3,462,148
GAME BOARD AND VEHICLE WITH VEHICLE TRAPPING MEANS
Filed Sept. 13, 1965 2 Sheets-Sheet 1
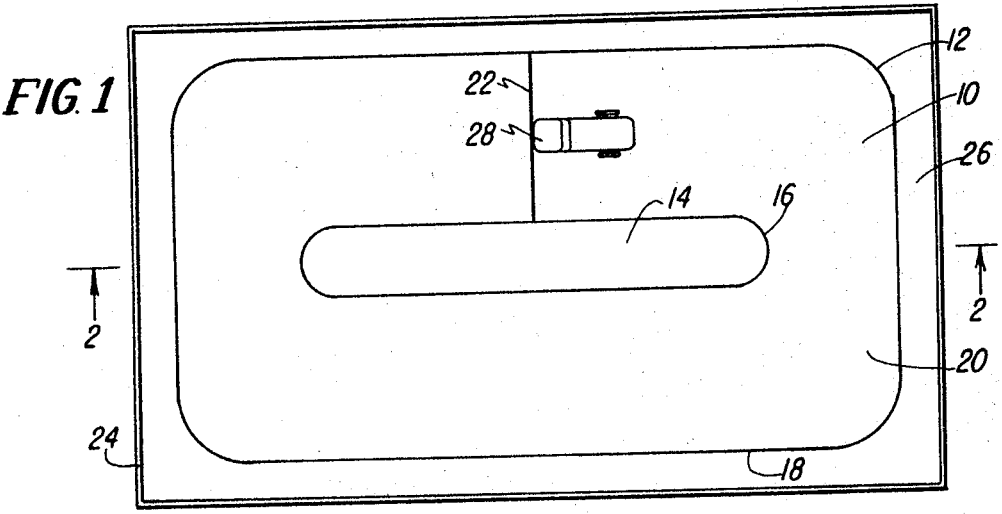
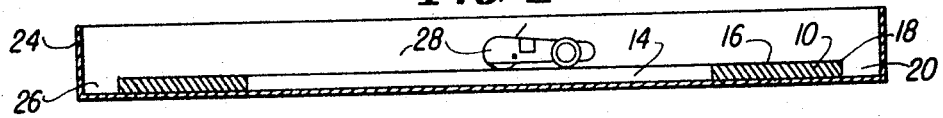
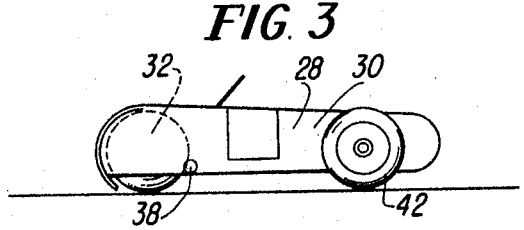
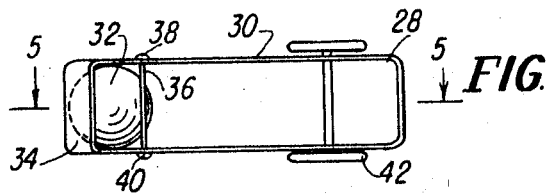
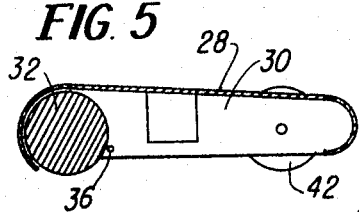
INVENTOR.
JAMES A. FORS
BY
Prangley, Baird, Clayton, Miller &
Vogel.
ATTYS.

Aug. 19, 1969  J. A. FORS  3,462,148
GAME BOARD AND VEHICLE WITH VEHICLE TRAPPING MEANS
Filed Sept. 13, 1965  2 Sheets-Sheet 2
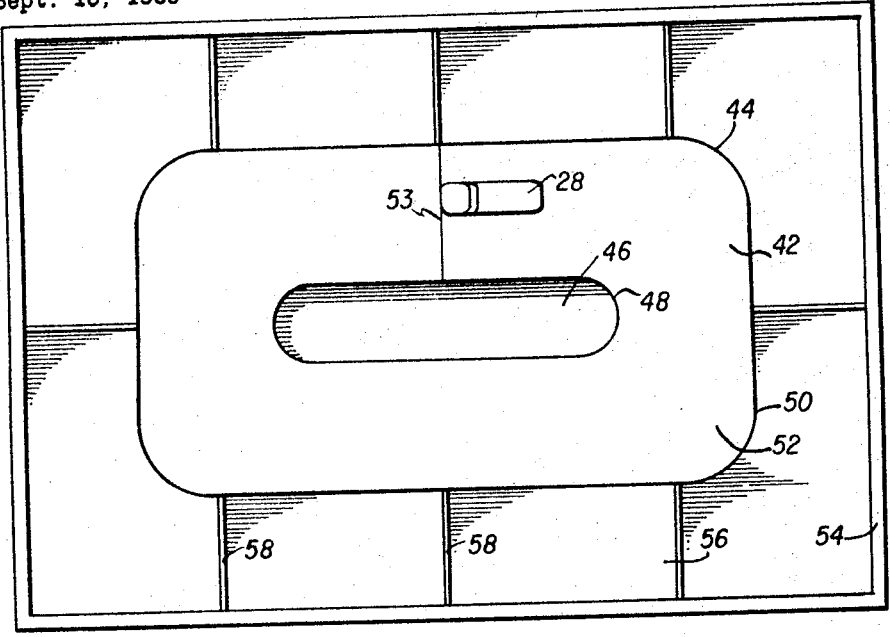
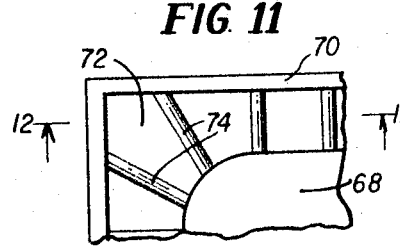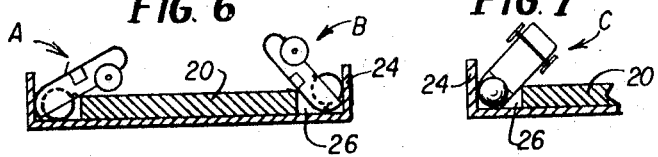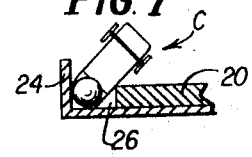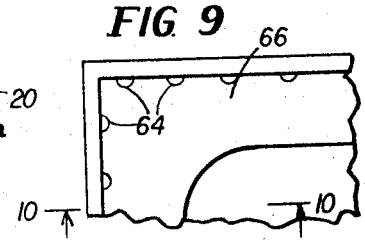
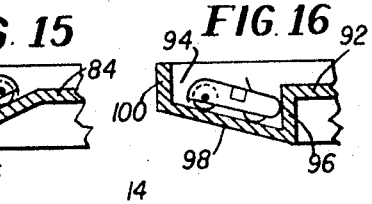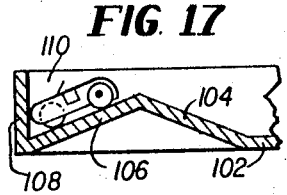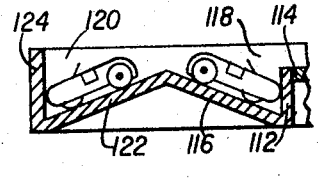
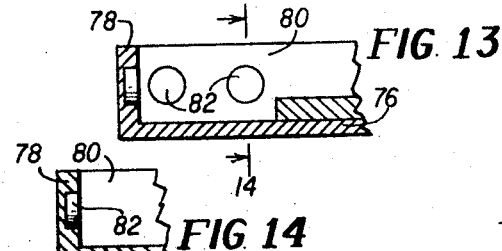
INVENTOR
JAMES A. FORS
BY
Bromgley, Baird, Clayton, Miller & Vogel.
ATTYS.

United States Patent Office 3,462,148
Patented Aug. 19, 1969

3,462,148
GAME BOARD AND VEHICLE WITH
VEHICLE TRAPPING MEANS
James A. Fors, 4958 W. Parker Ave.,
Chicago, Ill. 60639
Continuation-in-part of application Ser. No. 98,979,
Mar. 28, 1961. This application Sept. 13, 1965,
Ser. No. 491,490
Int. Cl. A63b 67/14; A63f 9/14
U.S. Cl. 273—116
9 Claims

ABSTRACT OF THE DISCLOSURE

This invention relates to a game of skill. More particularly, it relates to a racing game in which a generally rectangular game board with rounded corners and an elongated central opening therein is provided. The board which thus defines an endless path and further carries a suitable indication of a starting line is mounted in a shallow open top box larger in dimensions than the board so that a trough of generally uniform width is provided between the perimeter of the board and the walls of the box. For use with the board a toy automobile is provided which is supported at the rear on a pair of wheels and at the forward end on a steel ball which is loosely retained in the automobile body so as to be readily rotatable therein and project downwardly below the automobile body to serve as a support. As a consequence of this structure when the automobile is supported on a surface inclined to the horizontal the forward end of the automobile moves downwardly in front of the remainder. In use the automobile is placed on the starting line on the board and by manual manipulation the automobile is caused to travel around the endless path provided by the board either as many times as possible or as rapidly as possible without causing the automobile to leave the path and enter the surrounding trough or the central opening thereupon interrupting its movement about the path. To this end in one embodiment of the invention the trough has a width which is less than the overall length of the automobile. In another embodiment the trough is provided with a plurality of laterally extending walls which divide it into sections. In other embodiments the trough is provided with a plurality of ribs either on the outer wall or on the floor of the trough. In still another embodiment magnets are mounted in the trough and alternatively the trough is provided with a sloping floor.

This application is in part a continuation of application Ser. No. 98,979, filed Mar. 28, 1961, now abandoned.

This invention relates to a game of skill. More particularly, it relates to a racing game.

Automobile racing is very popular in many parts of the world due to the action and excitement of cars maneuvering around curves, speeding down straightaways in a race against time and other cars, and the ever present danger of spinouts or crashes that might occur at any time to either momentarily delay a car's progress in the race or to eliminate it from the race entirely.

It is an object of this invention to provide a new racing game involving manual skill in the manipulation of a movable object on a game board.

A further object is to provide such a game in which an endless path of predetermined size and shape is indicated and means is provided to interrupt movement of said movable object when it leaves such path.

Still another object is to provide such a game in which the movable object simulates a vehicle such as an auto, boat or the like.

It is a further object of this invention to provide a very economical and portable racing game that provides as many of the thrills of real automobile racing as possible in a very limited space.

It is another object of this invention to provide a simple means of racing toy cars against predetermined times or against other cars on a toy track.

Another object of this invention is to provide a means for spinouts and crashes to occur and means for easily distinguishing between the two and for determining whether a racing car can continue in the race or not.

Still another object is to provide means for retaining the car and means indicating what portion of a lap is completed when a spinout or crash occurs and indicating the spot for a re-start if the car is able to continue.

Other objects will appear hereinafter.

In real automobile racing, when a car spins out on a curve or leaves any part of the track, it can back up or maneuver back onto the track at that point and can continue its race against time or other cars. Spinouts delay a car in road racing and time is lost. However, if a car rolls over on its side or back, it of course crashed and cannot go further. In this case, the car only successfully completes that portion of a lap up to where it crashes when it is scoring for lap points, money, or lap records.

Electric slot car racing is another type of race where a car can go back on the track after it spins out or leaves the track and continues to race unless it turns over on its side or back in a crash. When this type of accident occurs, the car is removed from the track and is out of the race. When racing against predetermined time, each slot car is credited with various points for both the number of laps or fractions of a lap that are completed within the time limit. The more spinouts a car has, the more often it is delayed in its progress around the track. If a car turns over and crashes, it is only credited for the laps and fractions of a lap that are completed before crashing.

It is the purpose of this invention to provide a new game with the means of achieving all of these various elements of automobile racing.

In order that the invention may be better understood, reference is made to the accompanying drawing which forms a part of this specification and in which—

FIGURE 1 is a plan view of a game board and racing auto embodying the features of the present invention;

FIGURE 2 is a view in cross section on the line 2—2 in FIGURE 1;

FIGURE 3 is an enlarged detailed view in elevation of the racing auto shown in FIGURES 1 and 2;

FIGURE 4 is a bottom plan view of the racing auto shown in FIGURE 3;

FIGURE 5 is a view in cross section on the line 5—5 in FIGURE 4;

FIGURE 6 is a view in vertical cross section through the game board shown in FIGURE 1 illustrating position of cars which have left the track;

FIGURE 7 is a view similar to FIGURE 6 showing another position of a car which has left the track;

FIGURE 8 is a view similar to FIGURE 1 showing a modified form of game board;

FIGURES 9 and 10 are fragmentary views showing, respectively, in plan and cross section, a further modification of the game board;

FIGURES 11 and 12 are views similar, respectively, to FIGURES 9 and 10, and showing still another modification of the game board.

FIGURES 13 and 14 are views similar, respectively, to FIGURES 9 and 10, a still further modification of the game board; and FIGURES 15, 16, 17 and 18 are views similar to FIG- URE 10 showing four additional modifications of the game board.

Referring first to FIGURES 1 and 2, it will be seen that there is shown a game board designated generally 10. The board 10 as shown is generally rectangular in shape but is provided with rounded corners as at 12. This board 10 is also provided with an elongated centrally located opening 14, the perimeter of which is designated 16. The lines forming this perimeter 16 and the perimeter 18 of board 10 together define an endless path 20 on the surface of board 10. At some selected place along this path 20 a starting line 22 is preferably indicated. Board 10 may be formed of a piece of wood, preferably thin, as shown, or of any other desired material, such as plastic, for example, styrene.

The board 10 is preferably positioned in a generally central location in a box or shallow open top container 24 larger in dimensions than board 10 providing a trough 26 of generally uniform width lying between the perimeter 18 and the upright walls of container 24 so that it completely surrounds board 10. The board 10 may be glued, cemented or otherwise suitably secured to the bottom of box 24 to maintain it in the desired central location therein.

The racing auto 28 shown at the starting line 22 in FIGURE 1 is shown in detail in FIGURES 3, 4 and 5. As may be seen, it comprises a body 30 simulating the body of a racing auto and a ball 32, preferably formed of steel. The body 30 is preferably formed of thin sheet metal or plastic and the ball 32 is housed in the body 30 at the front end under what would be called the hood of a full scale automobile. As shown, the ball 32 when seated in body 30 projects down through an opening in the body and serves to support the front end thereof.

Ball 32 is loosely received in housing 30 and is free to rotate therein about any axis. It is retained in housing 30 by a portion 34 thereof which extends down around the ball 32 as shown in FIGURE 4 and by an opposed pin 36 supported in the side walls of body 30 and maintained in place by a head 38 on one end and by an upset portion 40 on the other formed after the ball 32 and pin 36 are in place. The wheels 42 providing the rear support may be non-rotatable and formed as an integral part of body 30 or, if desired, may be formed separately and rotatably mounted on an axle carried by body 30. Alternately, wheels 42 may be omitted entirely so that the rear of body 30 rests directly on board 10.

As indicated above, both board 10 and the object or auto 28 may vary considerably within the scope of this invention. It is an important feature of the invention that the board 10 includes means defining an endless path but the size and shape of this path may be varied as desired. It is also a preferred feature that this path, such as the path 20, should be defined and surrounded by a depending edge or wall of the board for reasons which will become clear hereinafter. Centrally of the board, it is also preferable that the path be defined by one or more depending edges or walls such as are provided by the opening 14.

Considerable variation is possible in this connection, however, For example, in a board such as the board 10, the central opening 14 shown may be replaced by two circular openings located at approximately the same places as the ends of the opening 14 in board 10. It will also be apparent that the board 10 and the box or container 24 may be combined and formed as a unit. While the path 20 should be a smooth surface, it need not necessarily be planar as shown and may, if desired, be made slightly concave laterally to provide banks at the turns and if desired shaped to simulate hills on a road.

The size and configuration of the board shown and of the path thereon are merely illustrative and may be varied as desired. Thus, instead of being endless, the path on the board may be tortuous and have ends. It is also within the scope of the invention to provide a board on which only the major portion of the outer edge of the endless path is defined by the depending edge or wall, for example, on a rectangular board a portion of the board at the corners may lie outside the path and provide places at which the board may be held manually. Similarly, in the case of a tortuous path at least the major portion of the edges thereof should be defined by the depending edge or wall.

The movable object comprises essentially a sphere or ball preferably formed of a material of substantial density such as the ball 32. It is also preferable that the ball be loosely housed within a body simulating a racing device such as the housing 28 shown and at the forward end of the device in such a position that it forms the front support. In such structures, the ball, which is free to rotate about any axis, tends to move ahead of the rear portion of the object under the influence of gravity, and thus in movements of the object produced by tilting the board as hereinafter described, the part of the object designed to be the front end always occupies this position.

Toy cars may be raced on a track, such as is shown in FIGURE 1, one at a time, against different predetermined times such as half a minute, one minute or three minutes to see how many laps and fractions of a lap can be completed within the time limit to score points. Each car can be raced against a sweep second hand of a watch or clock, or against a special egg timer supplied with the game. If desired, a predetermined number of laps can be raced for the best time, or two cars can race together simultaneously on separate tracks for a specified time or number of laps.

In playing the game which is the subject of this invention in any of the ways described in the preceding paragraph, the object 28 is positioned on the path 20 carried by the board 10 in any desired place but usually at the starting line 22. The board 10 is then held in one or both hands and by tilting it so that the surface of the board tilts downwardly away from the front end of the object in the general direction of path 20, the object is caused to move along this path under the influence of gravity. When the object is moving along the path, it may be caused to change direction to follow changes in direction of the path by manipulating the board to change the way in which it tilts. After some practice an individual can keep the object 28 moving continuously around and around on the path 20 at a good rate of speed.

It is an object in the manipulating of the board to maintain the moving object on the predetermined path at all times and the construction of the board is such as to interrupt the movement of the object whenever it leaves the predetermined path. When a car spins out or leaves the track during a race, it is quickly stopped and restrained by the channel, pit, or trough 26 that completely surrounds the outside edges of the track. If the car is held by this channel in an upright position, the car spun out and it is immediately placed back on the track, and the car continues to race with a loss in time. When the channel catches and traps the car on its side or in an inverted position, however, it is out of the race. It then only scores points for the laps and fractions of a lap that are completed before crashing in that particular heat.

In order to operate this invention or racing game, the depending channel or trough surrounding the outside edge of the track must severe several purposes and it must have the essential means to do this. It must (1) easily allow a racing car to go off the edge of the track into the channel so that it can test the skill of the player. (2) It must confine a portion of the car to the channel to prevent it from getting back on the track or going off onto the floor. (3) It must restrain the car from progressing along the channel after it leaves the track. (4) It must be able to hold the car and keep it in a stationary position at any time during the race to indicate how far the car has progressed around the track. (5) It must provide enough room for the forward portion of the car to enter the channel and to allow room for the car to twist over on its side and back or remain upright and to suppress further movements. (6) It must trap the car and indicate what fractions of a lap are completed at the end of each spinout or crash for scoring points and to indicate a specific re-starting position for each spinout.

In the embodiment of the invention illustrated in FIGURES 1 and 2 of the drawings, the foregoing requirements are met by making the width of the channel 26 less than the overall length of the car so that when the heavier nose of the car extends over the perimeter 18 of the track and drops down into the channel 26, the car will hang over the edge of the track and stop short when its nose comes in contact with the outer vertical wall of the channel. When the car is tilted down in a narrow channel like this, it is confined against the channel with part of the car still hanging over the edge of the track. The channel suppresses all movements of the car and keeps it in a stationary position. The position and location of the car indicates whether the car can be re-started again or not and where it should be re-started if it remains upright. If, however, the car twisted over on its side or top, then its position and location indicate how far it progressed around the track for lap points and that the race is over.

The manner in which the channel 26 traps a car in the various positions described in the preceding paragraph is illustrated in FIGURES 6 and 7. Thus in FIGURE 6 the car designated by the letter A has been trapped in an upright position and may be moved back on the track and started again at the place where it was caught. On the other hand the car designated B in FIGURE 6 has been trapped in an upside down position and that designated C in FIGURE 7 has been trapped resting on its side and both of cars B and C are thus considered to have crashed so that they can be started again only in a new race.

When a heavy car is used, it is preferred that this felt, foam, or rubber strips be used inside the narrow channel 26 along the walls, so that the strips will confine and hold a heavy car without damage to the car or its finish. In addition, in every case it is desirable to provide signs around the entire length of the channel to indicate the various fractions of a lap around the track. Such marks indicating the fractional parts of a lap may be printed on the channel, wall, or even on the track itself.

Instead of employing a narrow channel such as channel 26 to trap and retain the car and keep it from progressing around the channel during a race, it is within the scope of the invention to employ other means for accomplishing that purpose. A simple means is to divide the channel into quadrants, and preferably into eighths, with a wall or partition dividing each section. Each section is labeled as to the various quarters and eights of a lap that are represented around the track. Whenever a car goes into any part of this channel, the entire car is retained in the channel and the car is trapped in the section that it enters and is stopped at the dividing wall. If the car remains upright, it is re-started at the dividing wall. Otherwise, the race has ended and the dividing wall indicates how far the car has progressed around that lap.

A modification of the invention embodying the features described in the preceding paragraph is illustrated in FIGURE 8 of the drawings. The board 42 shown therein is identical with the board 10 previously described, being provided with rounded corners 44 and a centrally located elongated opening 46, the perimeter of which is designated 48. Thus the lines forming this perimeter 48 and the perimeter 50 of board 42 define an endless path 52 corresponding to the path 20 on board 10. The board 42 is designed for use with the same racing vehicle 28 previously described which is shown in position at a designated starting line 53.

The board 42 like the board 10 is also preferably positioned in a generally central location in a box or shallow open top container 54 larger in dimensions that the board 42 providing a trough 56 of generally uniform width lying between the perimeter 50 and the upright walls of container 54 so that it completely surrounds board 42. Again similarly to board 10, board 42 is preferably suitably secured to the bottom of box 54 to maintain it in the desired central location therein.

It is to be noted, however, that, in contrast with channel or trough 26, the width of trough 56 is substantially greater than the length of the racing vehicle 28. Accordingly a series of partitions 58 is suitably secured in trough 56 to trap a car as previously described when it goes off of the board 42. As may be seen, the partitions 58 extend at right angles to the perimeter 50 between the latter and the vertical walls of container 54 although they need not necessarily extend the full width of trough 56 so long as they are wide enough to serve the purpose of trapping the car. Preferably one partition 58 is located opposite the starting line 53 as shown and the remainder are located opposite points on perimeter 50 which are spaced therearound at distances from the said starting line which are equal to one or more eighths of the total length thereof. The partitions 58 should extends a distance above the bottom of container 54 sufficient to enable them to perform their function of trapping a car but otherwise their vertical extent may be varied as desired. In the modification shown the partitions 58 at their inner ends which adjoin board 42 are of the same height as that board and their top edges slope upwardly to a height adjacent the walls of container 42 which is approximately equal to the height of those walls.

Another means for trapping and holding a car in a channel, that is either narrower or wider than the length of the car, consists of protruding vertical ribs or teeth positioned along the inside face of the outer wall of the channel. These ribs or teeth will trap the nose of a car in a channel of any width, depending upon how far they protrude. The same rules of the game are applied.

Such a structure is shown in FIGURES 9 and 10. These figures show a board 60, similar to the board 10, mounted in a container 62 similar to containers 24 and 54. Suitably secured to the inner face of the vertical wall of container 62 is a series of vertically extending ribs 64. As is apparent, a car, such as car 28, leaving the board 60 and entering the channel 66, will have its forward progress arrested by engagement with a rib 64.

A closely related alternative to the modification illustrated in FIGURES 9 and 10 is shown in FIGURES 11 and 12. In this form of the invention a board 68 is suitably mounted in a container 70, both being similar to the boards and containers previously described, so that they provide a channel 72 which completely surrounds the board. Suitably secured to the bottom of this channel is a series of ribs 74. As will be appreciated, the resulting washboard-like configuration of the bottom of channel 72 serves to interrupt the forward movement of a car 28 which leaves the board 68 and enters the channel.

Another embodiment of the invention which is closely related to those illustrated in FIGURES 9 through 12 is shown in FIGURES 13 and 14. As in the structures previously described there is a board 76 appropriately mounted in a container 78 so as to provide a channel 80 completely surrounding the board. For reasons which will appear this embodiment contemplates the use of a car which is formed in substantial part, at least, of ferrous metal as is the preferred car 28 described above.

To provide means for interrupting the forward movement of the car after it enters the channel 80, a series of magnets 82 is embedded in the inner face of the vertical wall of container 78. Alternatively, they may be embedded in the bottom of channel 80 or both in the side and bottom walls. In either case a car 28 in channel 80 is attracted to and held by a magnet 82 thereby interrupting its forward progress.

Another means for interrupting the forward movement of a car which leaves the board on which it is being raced as described above contemplates the provision of a channel surrounding the board which has a bottom wall which slopes downwardly to the base of a vertical wall, preferably the outer wall of the channel. In other words the intersection of the bottom wall of the channel and the vertical wall is the lowest part of the channel. Due to the slant of the channel floor, the heavier front end of the car always keeps the nose of the car confined up against the vertical channel wall, with the car right side up, on its side, or upside down, as the case may be, no matter how wide the channel is. The car being confined in this position with its nose up against the wall, it cannot turn or progress around the channel.

FIGURES 15 through 18 illustrate various ways of providing such a channel with a sloping floor which serves as a means for trapping a car which has left the racing board or track. Thus, FIGURE 15 shows a fragment of a board or track 84, and sloping down from it the bottom wall 86 of a channel 88, which wall 86 intersects an outer vertical wall 90 at the lowest part of the channel. By virtue of this construction a car 28 entering the channel ends up with its nose against the outer wall in the position shown if it remains upright or otherwise as the case may be.

FIGURE 16 also shows a fragment of a board or track 92 which is surrounded by a channel 94 having an alternative configuration. Thus channel 94 is defined by a wall 96 depending from the track 92, a bottom wall 98 sloping upwardly from the wall 96 to intersect an outer vertical wall 100 which completes the channel. In this embodiment also, as may be seen, a car 28 entering the channel 94 ends up with its nose in engagement with the vertical wall 96 at the lowermost part of the channel.

In the structure shown in FIGURE 17 the flat portion of the board or track 102 is immediately surrounded by an upwardly sloping or banked rim portion 104 which is in turn surrounded by a wall 106 sloping downwardly and outwardly to an intersection with an outer vertical wall 108 and forming therewith a channel 110. This channel, as shown, serves in the manner previously described to trap a car 28 which enters it.

As indicated in FIGURE 18 a double channel arrangement may be provided, if desired. In this structure a vertical wall 112 depending from the board or track 114 together with a wall 116 sloping upwardly therefrom form a channel 118. The second channel 120 is defined by a wall 122 sloping downwardly and outwardly from the upper end of wall 116 and intersecting an outer vertical wall 124 at the lowermost portion of the said channel. Each of the channels 118 and 120 will, as shown, trap a car 28 which enters it, the channel in which a car comes to rest depending upon the speed and direction at which it leaves the track 114.

The depending wall provided centrally of the board along the inner edge of the path further adds to the skill required in the manipulation of the object as will be apparent. The inner pit or channel so formed is preferably employed with each of the above described types of channels when they surround a track of the general shape of those shown in FIGURES 1 and 8. Since it is relatively easy to maintain the moving object on the more or less straight portions of the path, the inner depending walls or edges along these straight portions may be omitted if desired as indicated above. To further facilitate the use of the board and object, mechanical or electrical means may be provided at some predetermined position on the path, such as the starting line 22, to indicate or record the number of times the moving object passes this position or line. On the other hand when the shape of the track is irregular, as for example when it includes one or more S curves, it is desirable to provide car trapping channels as described above on both sides of each section thereof.

The racing game described above may be utilized for amusement in a variety of ways. Thus, a single person may try to see how many times he can cause the object to travel completely around the path with falling off or how fast he can make it travel through one or more laps, and where two or more persons are involved, they may compete against each other by successively manipulating the board by some predetermined plan such as (1) racing for a predetermined length of time with or without spinouts occurring; (2) racing for a predetermined number of laps with or without spinouts occurring; (3) racing until a spinout occurs with or without a time limit; and (4) racing until a crash occurs with or without a time limit. Other variations are possible and points may be scored in other various ways. Obviously, of course, with two or more boards, the boards may be manipulated simultaneously in such competition.

The advantages of the present invention will be readily apparent from the foregoing description. The invention provides a novel and inexpensive toy which may be a source of amusement to persons of all ages.

It is apparent that many widely different embodiments of this invention may be made without departing from the spirit and scope thereof and, therefore, this invention is not intended to be limited except as indicated in the appended claims.

I claim:

1. A racing game comprising a game board having a smooth endless path thereon, a substantial portion of which is planar laterally of the path, a racing object movable lengthwise of said path under the influence of gravity and comprising a body simulating the body of a vehicle and having a spherical ball loosely housed therein at the forward end of the vehicle so as to be free to rotate about any axis with a portion of the ball projecting downwardly out of said body and serving as the front support therefor, the said forward end of the vehicle including the ball having a weight sufficient, relative to the weight of the remainder, to cause the said forward end to move downwardly in front of the remainder of the vehicle when the vehicle is being supported in a normal position on a surface inclined to the horizontal, and means outside of the outer perimeter of said path for trapping said racing object when in the course of its movement generally lengthwise of said path it passes, at least in part, over the said otuer perimeter and for interrupting the further movement of the said object at approximately the place where it passes over the said perimeter, said means outside of the outer perimeter being channel shaped with its open face uppermost and in which the said means is contiguous to the said perimeter and completely surrounds it.

2. A game as described in claim 1 in which the portion of said channel shaped means which is contiguous to the said perimeter is located therebelow.

3. A game as described in claim 2 in which the width of the said channel shaped means is substantially less than the length of the said racing object.

4. A game as described in claim 2 in which the said channel shaped means contains a plurality of obstructions spaced lengthwise thereof providing the said means for interrupting the further movement of the object.

5. A game as described in claim 2 in which the said racing object is formed in substantial part of ferrous metal and in which the said channel shaped means contains a plurality of magnets spaced lengthwise thereof providing the said means for interrupting the further movement of the object.

6. A game as described in claim 2 in which the said channel shaped means has a wall the inner face of which is, at least approximately, perpendicular to the plane of the planar portion of the said endless path and in which the said channel shaped means has a sloping bottom wall which intersects the said inner face at the lowermost portion of the channel defined by the said channel shaped means.

7. A game as described in claim 2 which comprises a board providing the endless path and an open topped container the bottom inner face of which has dimensions greater, respectively, than the length and width of said board, the said board being secured to the said bottom face in a generally central location so that an upwardly facing channel is formed between the said board and the outer walls of the said container, which channel completely surrounds the said board.

8. A game as described in claim 2 in which all of the curves in the endless path turn inwardly towards the center of the area surrounded by the perimeter of said path.

9. A game as described in claim 8 which comprises channel shaped means located within the inner perimeter of said path for trapping the said racing object when it passes, at least in part, over the said inner perimeter.

References Cited

UNITED STATES PATENTS

| | | | |
|---|---|---|---|
| 500,888 | 7/1893 | Grubbs | 273—113 |
| 2,517,324 | 8/1950 | Kurose. | |
| 2,863,666 | 12/1958 | Aronson | 273—108 |

FOREIGN PATENTS

| | | |
|---|---|---|
| 16,419 | 10/1895 | Great Britain. |
| 669,125 | 3/1952 | Great Britain. |
| 1,312,061 | 11/1962 | France. |

ANTON O. OECHSLE, Primary Examiner

T. ZACK, Assistant Examiner

U.S. Cl. X.R.

46—202; 273—86

UNITED STATES PATENT OFFICE
CERTIFICATE OF CORRECTION

Patent No. 3,462,148  
August 19, 1969

James A. Fors

It is certified that error appears in the above identified patent and that said Letters Patent are hereby corrected as shown below:

Column 4, line 64, "severe" should read -- serve --. Column 5, line 36, "this" should read -- thin --. Column 6, line 21, "extends" should read -- extend --. Column 8, line 1, "with" should read -- without --.

Signed and sealed this 21st day of April 1970.

(SEAL)  
Attest:

Edward M. Fletcher, Jr.  
Attesting Officer

WILLIAM E. SCHUYLER, JR.  
Commissioner of Patents